United States Patent [19]
Burke

[11] 3,735,636
[45] May 29, 1973

[54] LEVEL FEELER
[75] Inventor: Alun Burke, Zurich, Switzerland
[73] Assignee: Contraves AG, Zurich, Switzerland
[22] Filed: July 16, 1971
[21] Appl. No.: 163,267

[30] Foreign Application Priority Data
Aug. 7, 1970 Switzerland..................11910/70

[52] U.S. Cl.......................73/290 R, 73/37.5, 73/298
[51] Int. Cl...............................................G01b 13/12
[58] Field of Search.................73/290, 298, 37.5, 73/37, 505; 137/81.5

[56] References Cited
UNITED STATES PATENTS
3,481,180  12/1969  Jones....................................73/37.5
3,641,808  2/1972  Smirmaul..............................73/37.5
3,641,809  2/1972  Bermel..................................73/37.5

*Primary Examiner*—Richard C. Queisser
*Assistant Examiner*—Denis E. Corr
*Attorney*—Werner W. Kleeman

[57] ABSTRACT

A level feeler, especially a liquid level feeler of the type containing fluidic circuit components and a feeler tube, wherein the feeler tube is arranged and constructed such that within the effective proximity zone of the fluidic-vortex-proximity feeler there are provided openings communicating with the surrounding atmosphere and the helically-shaped advancing or propagating feeler vortex of the fluidic-vortex-proximity feeler can penetrate without hinderance into the feeler tube and can be guided by such feeler tube.

4 Claims, 1 Drawing Figure

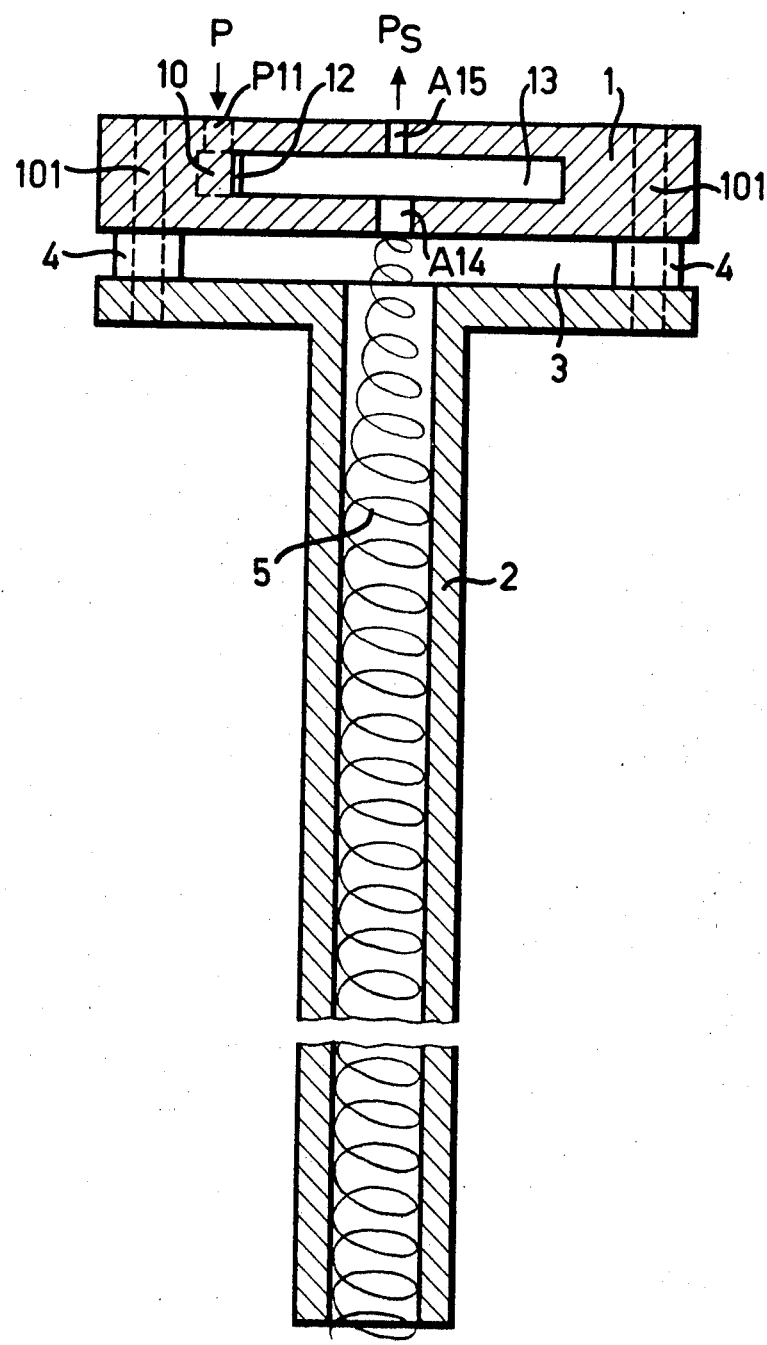

LEVEL FEELER

BACKGROUND OF THE INVENTION

The present invention relates to a new and improved construction of level feeler, especially a feeler for determining the level of a liquid, and which is of the type embodying fluidic circuit components and a feeler tube.

Liquid level feelers utilizing fluidic components are known to the art wherein sensitive fluidic backflow or reverse flow elements, in conjunction with an immersion tube (feeler tube), make use of the return flow principle. Liquid level feelers of this type have the tendency of forming undesired bubbles in the measuring medium. By resorting to special circuitry techniques it is possible to at least partially suppress bubble formation or to render such ineffectual upon the system or circuitry.

SUMMARY OF THE INVENTION

Still, it is to be appreciated from what has been explained above that the prior art is still in need of a level feeler wherein the formation of bubbles can be prevented in a relatively simple manner. Hence a primary objective of this invention is to provide a fluid level feeler which is equipped with very simple means rendering possible the prevention of the formation of bubbles during immersion of the feeler tube into the measuring medium.

Now in order to implement this and still further objects of the invention, which will become more readily apparent as the description proceeds, the invention contemplates constructing and arranging a feeler tube with respect to a conventional fluidic-vortex-proximity feeler in such a manner that openings communicating with the surrounding atmosphere exist within the effectual proximity zone of the fluidic-vortex-proximity feeler. The helically-shaped advancing feeler vortex of the fluidic-vortex-proximity feeler can penetrate without obstruction into the feeler tube and then be guided through such tube. It is preferable to arrange the feeler tube with an air gap with respect to the fluidic-vortex-proximity feeler and coaxially with respect to its feeler vortex-outlet bore.

BRIEF DESCRIPTION OF THE DRAWINGS

The invention will be better understood and objects other than those set forth above, will become apparent when consideration is given to the following detailed description thereof. Such description makes reference to the annexed drawings wherein the single FIGURE schematically illustrates in longitudinal sectional view a preferred embodiment of level feeler designed according to the teachings of the present invention.

DETAILED DESCRIPTION OF THE PREFERRED EMBODIMENT

Describing now the drawing, the single FIGURE illustrates a cross-sectional view of a preferred construction of inventive level feeler which embodies a known fluidic-vortex-proximity feeler 1, a feeler or immersion tube 2 and an air gap 3 which is formed through the use of the spacer elements 4 or similar expedients. Since the fluidic-vortex-proximity feeler 1 is of a type well known to the art it will only be considered herein to the extent necessary to fully understand the underlying concepts of the present invention. This proximity feeler 1 is provided with threaded throughpassage bores or holes 101 which receive any suitable and therefore non-illustrated connecting screws for interconnecting the various components to one another. Fluidic-vortex-proximity feeler 1 is further provided with a supply pressure connection P11, the pressure channel 10 equipped with the peripheral inlet opening 12 communicating with the vortex compartment or chamber 13, the feeler-vortex outlet connection or opening A14 and the signal outlet connection A15.

The mode of operation of this well known fluidic-vortex-proximity feeler 1 is as follows: if the pressure connection or opening P11 is opertively connected with a source of pneumatic pressure P then, as a function of the geometric arrangement of the pressure channel 10 and the inlet opening 12, air will flow with a large tangential component and a small radial component into the cylindrical-shaped space of the vortex chamber or compartment 13. As a result, at the outlet A14 there is formed a helically-shaped advancing and expanding vortex employed as the feeler vortex 5. Whenever an object traverses the feeler vortex 5 within its effective proximity zone or range a signal $P_S$ is produced at the vortex compartment 13 owing to the back pressure, this signal $P_S$ is then delivered via the signal outlet A 15 to a suitable fluidic amplifier element for further processing. Fluidic-vortex-proximity feelers are known to the art which possess an effective proximity zone of, for instance, up to 6 millimeters and up to 15 millimeters. Generally, an OR/NOR-element is integrated into the fluidic-vortex-proximity feeler.

Now, as contemplated by this invention, at the fluidic-vortex-proximity feeler 1 there is mounted a feeler tube 2 with the air gap 3 within the proximity zone or range of such proximity feeler 1 so that the helically-shaped propagating and expanding feeler vortex 5 then penetrates without obstruction into the feeler tube 2 and can be guided by such tube. If a solid, liquid or foaming media appears at the end of the feeler tube 2 of the feeler vortex 5, then, as above described, the back pressure thus prevailing will produce at the vortex compartment 13 a signal $P_S$ which may be processed in known manner. The feeler tube 2 acts upon the feeler vortex 5 more or less like a solid body provided that the air gap or opening means 3 is located within the effectual proximity range. If, for instance, the immersed end of the feeler tube 2 is tightly sealed by an ascending liquid column then the air gap 3 functions as a short-circuit for the air pressure in the feeler tube 2. Consequently, the formation of bubbles in the measuring medium is thereby suppressed.

Owing to the selection of the fluidic-vortex-proximity feeler, the supply pressure, the subsequently connected fluidic amplifier element and the arrangement and dimensioning of the feeler tube it is possible for the manufacturer to readily fabricate level feelers in different lengths for liquid, foaming, pulverulent or granular media. Furthermore, feelers constructed in accordance with the teachings of the invention are free of the danger of explosion and do not contain any movable components. There is no direct contact between the air supply and the measuring medium.

While there is shown and described present preferred embodiments of the invention, it is to be distinctly understood that the invention is not limited thereto but may be otherwise variously embodied and practiced within the scope of the following claims.

What is claimed is:

1. A level feeler, especially a liquid level feeler, comprising a fluid-vortex-proximity feeler means having an effective proximity range, a feeler tube, means for arranging said feeler tube in spaced relationship with respect to said fluidic-vortex-proximity feeler means such that there are provided between said fluidic-vortex-proximity feeler means and said feeler tube opening means communicating with the surrounding atmosphere within the effective proximity range of said fluidic-vortex-proximity feeler means and such that the helically-shaped propagating feeler vortex of the fluid-vortex-proximity feeler means can enter without hinderance into said feeler tube and be guided by such feeler tube.

2. A level feeler, especially a liquid level feeler, comprising a fluidic-vortex-proximity feeler means having an effective proximity range, a feeler tube, means for arranging said feeler tube with respect to said fluidic-vortex-proximity feeler means such that there are provided between said fluidic-vortex-proximity feeler means and said feeler tube opening means communicating with the surrounding atmosphere within the effective proximity range of said fluidic-vortex-proximity feeler means and such that the helically-shaped propagating feeler vortex of the fluidic-vortex-proximity feeler means can enter without hinderance into said feeler tube and be guided by such feeler tube, said opening means defining an air gap interposed between said fluidic-vortex-proximity feeler means and said feeler tube.

3. The level feeler as defined in claim 1, wherein said fluidic-vortex-proximity feeler means is provided with means defining an outlet opening for the feeler vortex, said feeler tube being arranged coaxially with respect to said outlet opening.

4. A level feeler, especially a liquid level feeler, comprising a fluidic-vortex-proximity feeler means having an effective proximity range, a feeler tube, means for arranging said feeler tube with respect to said fluidic-vortex-proximity feeler means such that there are provided between said fluidic-vortex-proximity feeler means and said feeler tube opening means communicating with the surrounding atmosphere within the effective proximity range of said fluidic-vortex-proximity feeler means and such that the helically-shaped propagating feeler vortex of the fluidic-vortex-proximity feeler means can enter without hinderance into said feeler tube and be guided by such feeler tube, and said means for arranging said feeler tube with respect to said fluidic-vortex-proximity feeler means incorporates spacer means for locating said feeler tube in spaced relationship from said fluidic-vortex-proximity feeler to define therebetween said opening means in the form of an air gap communicating with the surrounding atmosphere.

* * * * *